United States Patent [19]

Pezzin et al.

[11] 4,230,219

[45] Oct. 28, 1980

[54] CAVITY IDENTIFICATION HANDLING SYSTEM

[75] Inventors: John J. Pezzin, Toledo, Ohio; Darius O. Riggs, Ottawa-Lake, Mich.

[73] Assignee: Owens-Illinois, Inc., Toledo, Ohio

[21] Appl. No.: 50,914

[22] Filed: Jun. 21, 1979

[51] Int. Cl.[3] .......... B65G 37/00

[52] U.S. Cl. .......... 198/481; 198/862

[58] Field of Search .......... 198/394, 383-386, 198/586, 588, 594, 860, 862, 481; 209/935

[56] References Cited

U.S. PATENT DOCUMENTS

| | | | |
|---|---|---|---|
| 2,796,969 | 6/1957 | Russell | 198/588 |
| 3,495,441 | 2/1970 | Laub | 198/394 X |
| 3,556,279 | 1/1971 | Cotter | 198/481 X |

*Primary Examiner*—Robert B. Reeves
*Assistant Examiner*—Douglas D. Watts
*Attorney, Agent, or Firm*—D. T. Innis; M. E. Click; D. H. Wilson

[57] ABSTRACT

In a cavity identification system the containers, which are upright, will be in single file and will be diverted from a linear conveyor by a rotating starwheel, having in the periphery thereof, pockets which generally correspond to the external diameter of the containers. The starwheel serves to guide the containers from the side of the conveyor, in slightly spaced-apart fashion, over an identification station where the cavity identification reader is positioned. After the container has passed the reading position, it will be moved back onto the moving conveyor so that the container will be carried to a later processing position. Guard rails are provided at both the incoming and outgoing ends of the cavity reading system to guide the containers in series relationship. The described inspection apparatus may be moved as a unit away from the side of the conveyor an amount to clear the normal span of the conveyor. When the inspection apparatus is moved away, a pair of straight rails will be automatically moved into the intervening gap in the permanent guard rails over that span of the conveyor which is bypassed for inspection purposes. The straight rails then span the gap between the permanent rails that are already present in overlying relationship to the conveyor, and in this manner the containers which are being moved by the conveyor may move uninterrupted during any period when the identification or inspection equipment is temporarily out of use.

10 Claims, 3 Drawing Figures

CAVITY IDENTIFICATION HANDLING SYSTEM

CROSS REFERENCES TO RELATED APPLICATIONS

This application is related to co-pending application Ser. No. 864,080 filed Dec. 23, 1977 now U.S. Pat. No. 4,175,236 wherein the cavity reading system is disclosed in detail. The disclosure of the co-pending application is incorporated by reference into the present application.

BACKGROUND OF THE INVENTION

It has been found desirable to be able to identify the mold cavity, of a glass forming machine, from which an individual container has been molded, particularly in the operation of a multiple cavity glass forming machine of the type known as the "IS" or Individual Section machine. Containers are presently made with numbers which will identify the particular mold in which the container is made. To be able to identify the containers at a position remote from the point at which it is made, the containers may be provided with a code and a reading apparatus will receive the containers from a moving conveyor with the containers arranged in successive alignment on the conveyor.

It is found that when a particular cavity is producing a defective bottle, it would be desirable to select out all of those containers made in a particular mold. Obviously, in order to do this it is necessary to be able to identify which container has been made in which mold.

In the past, it has been the practice to put in the bottom plate of each forming mold a number indicating the number of the cavity in relationship to the other cavities on the forming machine. For example, a ten section IS machine, if operating with three cavities per section, would produce as many as thirty (30) bottles in one complete machine cycling and, therefore, at least thirty (30) distinctive marks or numbers would be needed to identify each cavity.

After being formed, these bottles or containers will be moving in a single line on what is termed the machine conveyor which leads from the forming machine to an annealing lehr. After the containers have been annealed in the lehr, they will again be single-lined and generally will pass through inspection machines at which time defective containers will be segregated from acceptable containers. During the inspection of the containers by the inspection machine, a particular defect may be found in a recurring cycle which corresponds to a mold indicating that a particular mold is repeatedly producing a defective container.

While it is possible to continue to run the glassware forming line in such a manner that the defective containers will be segregated after the inspection, it has been thought to be more desirable to have the ability to select out the container which is defective by identifying the container prior to its being annealed. This will save some fuel in that the container will not have to be annealed and it will save wear and tear on the gauging and inspection machinery.

When the containers, in the present forming systems, are segregated or rejected by a gauging machine, the defective bottle is returned to the forming area where the forming machine operator may pick up the defective bottle and observe the cavity number molded in the bottom of the bottle. With this knowledge, if it were possible to have the bottles automatically identified by machinery as to cavity, then it would be possible for the operator to have the containers that are subsequently produced by the defective mold segregated prior to their arriving in the annealing lehr or prior to being gauged.

Several cavity identification systems have been suggested in which the containers which are to be identified are viewed from above. In most of these systems, however, it has been suggested that the containers must be moving in a straight line and stopped and rotated at an inspection position. The handling equipment did not provide for repairing the equipment while maintaining the flow of containers from the supply to the point of use. In such instances when it is required to replace bulbs or adjust the identification devices, it has been necessary to stop the flow of containers, effect the correction, and resume the flow of containers.

In the present case, where the only inspection that is being carried out is for the purpose of identifying which cavity of the molding machine produced the container, the criticality of every container being inspected or viewed is not considered crucial. Therefore, when it is necessary to repair or adjust the identification system the present invention provides means for continuing the movement of containers on the conveyor without any appreciable interruption.

SUMMARY OF THE INVENTION

Apparatus for handling glassware through an inspection position wherein a driven horizontal conveyor supporting a line of upright glass containers with guide rails for maintaining the containers in a generally straight line, in both coming into and exiting the inspection position and wherein additional container-engaging guide means are provided for guiding containers off line of the conveyor to an optical inspection zone. The optical inspection zone and the container-engaging guide means are movably mounted, as a unit, along with a straight line guide means such that the straight line guide means will be moved into alignment between the guide rail on the conveyor when the movable mounting means is moved away from the conveyor.

DETAILED DESCRIPTION OF THE DRAWINGS

Figure 1:
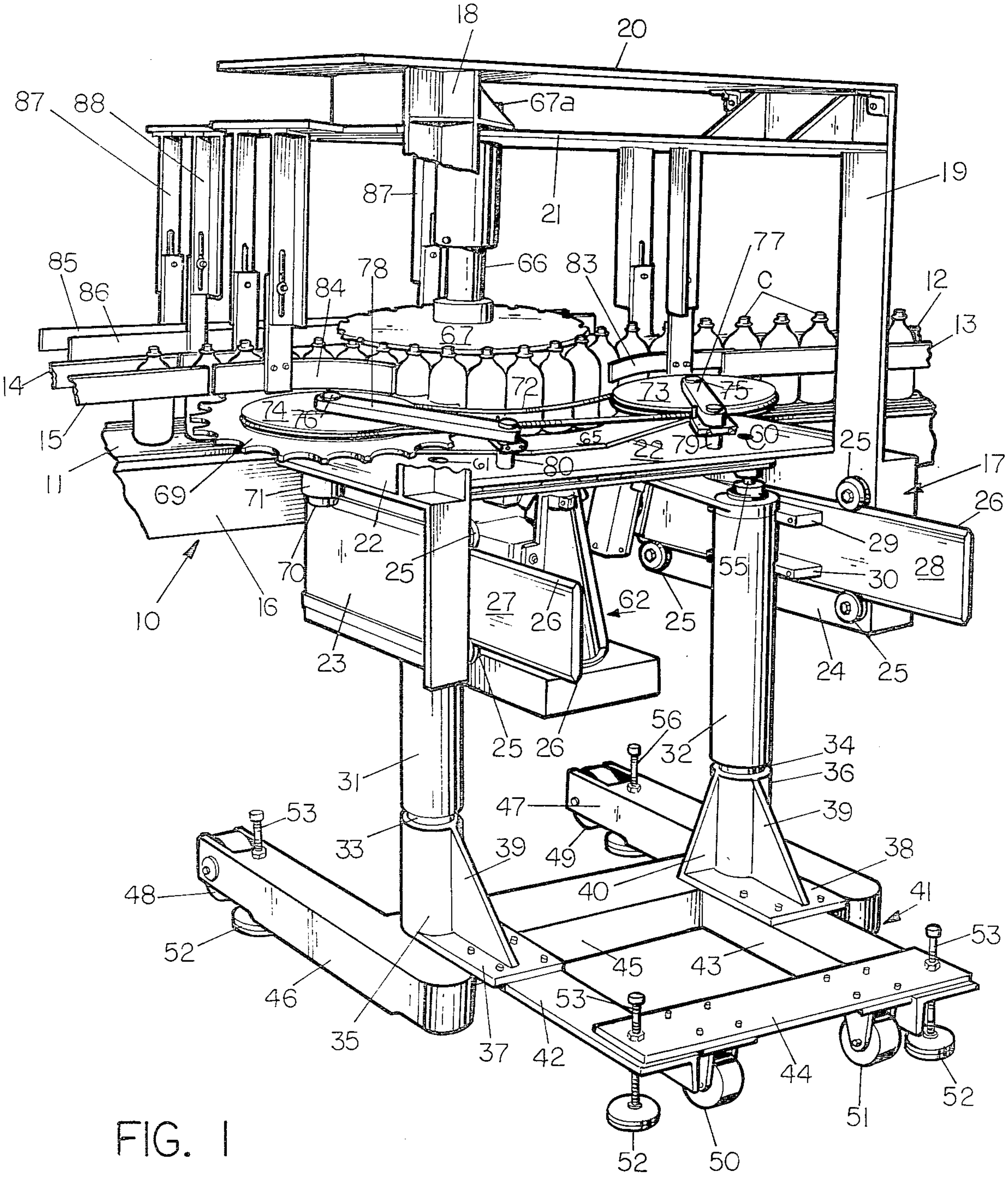
FIG. 1 is a perspective view of the apparatus of the invention shown in position adjacent the side of a conveyor.

With particular reference to FIG. 1, there is shown a horizontal conveyor generally designated 10 supporting a moving belt 11 on which containers C are positioned. Containers C are in a neck-up mode and moved from the right as viewed in FIG. 1. A first pair of fixed rails 12 and 13 overlie the conveyor 10 and are spaced apart a distance slightly greater than the diameter of the container C. The rails 12 and 13, therefore, serve to guide the bottles as they are moved by the belt 11. Rails 12 and 13 extend to a fixed position above conveyor 10 at which point they will be interrupted and after a predetermined gap a second pair of rails 14 and 15, in parallel alignment with rails 12 and 13, will continue the guiding of the containers as they exit from the gap which defines an inspection zone overlying the conveyor 10. At one side 16 of the conveyor 10 there is positioned a movable frame 17. The frame 17 generally takes the form of a rectangular member to which vertical uprights 18 and 19 are connected. The uprights are joined together at their upper ends by a horizontal platform 20. Beneath platform 20 is a generally horizontal supporting cover 21. The lower portion of the frame 17 is constituted by a generally horizontal supporting plate 22. Below the plate 22 the frame 17 has elongated, horizontally extending, vertical side plates 23 and 24. As can be seen when viewing FIG. 1, the plates 23 and 24 extend beneath the plate 22 and in the position shown in FIG. 1 and FIG. 3 will extend from the rear portion of the frame 17 to adjacent the side 16 of the conveyor 10.

Plates 23 and 24 are each provided with six inwardly facing grooved rollers 25. The rollers 25 are adapted to ride on the beveled edges 26 of a pair of horizontally extending support members 27 and 28. The members 27 and 28 are fixed by mounting brackets 29 and 30 to the side of spaced vertical cylinders 31 and 32 respectively. The cylinders 31 and 32 contain concentric shafts 33 and 34. These shafts 33 and 34 are threaded at their lower ends into complimentary threaded cylindrical members 35 and 36. The members 35 and 36 are supported in an upright manner by horizontal plates 37 and 38 respectively and fillets 39 and 40. Plates 37 and 38 are bolted to a frame 41 which is composed of parallel angle irons 42 and 43 which in turn are joined at one end by a rectangular plate 44, and at the opposite end by a channel iron 45. Channel iron 45 also extends between a pair of horizontally extending legs 46 and 47 to which rollers 48 and 49 are rotatably attached.

A pair of casters 50 and 51 are bolted to the underside of the plate 44. The casters 50 and 51 along with rollers 48 and 49 serve to support the frame 41 for horizontal movement relative to the floor, in a direction which is substantially normal to the side 16 of the conveyor 10. The frame 41, when the apparatus of the invention is in operation, supports the frame 17 adjacent to side 16 of the conveyor 10 and when in such position the rollers and casters will be unnecessary, and to avoid the possibility of the frame shifting relative to the conveyor, feet 52 carried at the lower end of vertically extending threaded bolts 53 are provided at the four corners of the frame 41.

Figure 3:
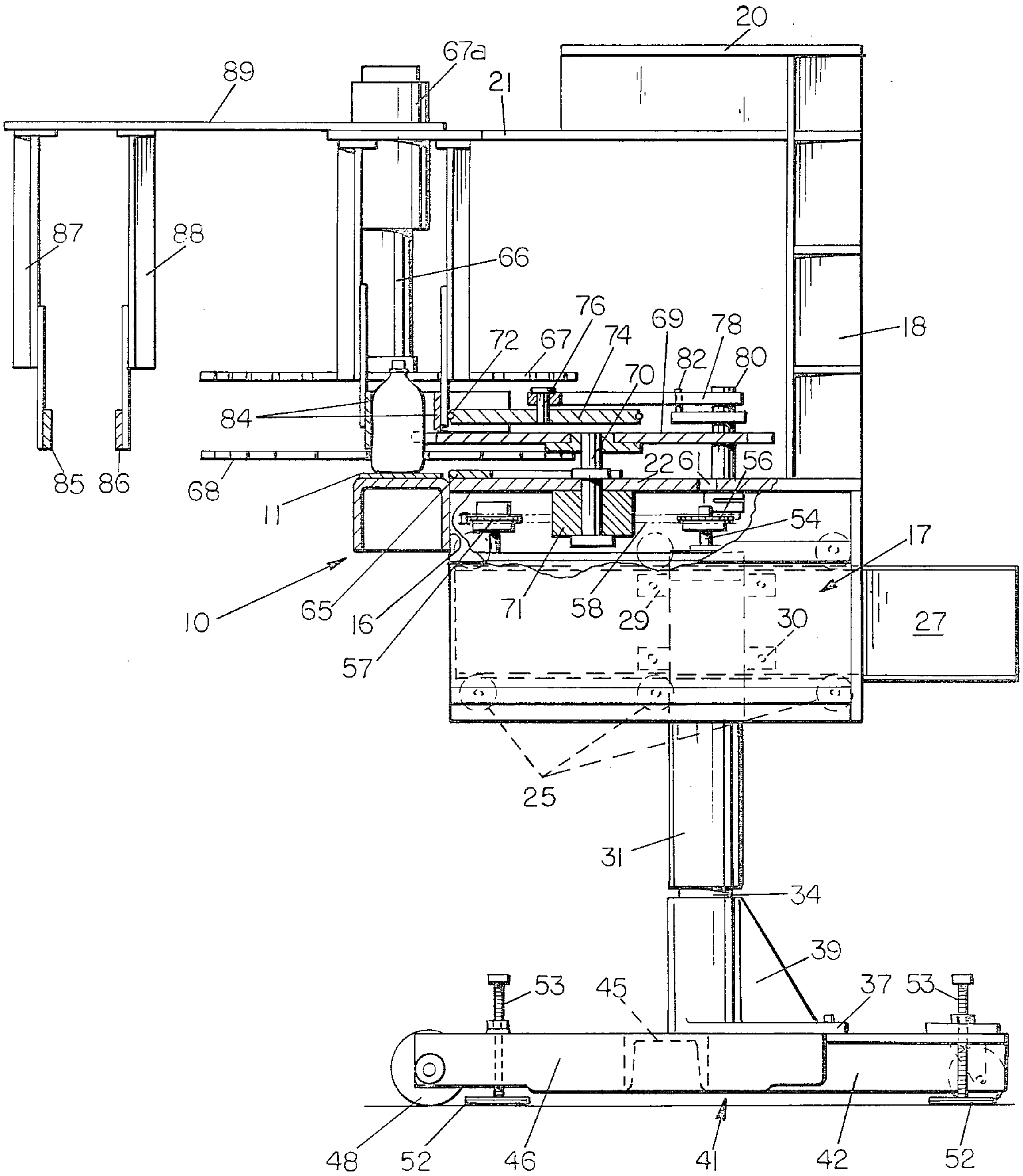
FIG. 3 is a cross-sectional view taken at line 3—3 of FIG. 2.

As can clearly be seen when viewing FIGS. 1 and 3, vertical adjustment of the bolts 53 will place the feet 52 on the floor and when pushing against the floor to any extent, will raise rollers and casters from the floor and thereby immovably support the frame 14 relative to the conveyor.

At the upper ends of cylinders 31 and 32 there are provided concentric shafts 54 and 55. These shafts 54 and 55 each have a sprocket 56 fixed thereto. In addition to the sprockets 56 that are fixed to the shafts 54 and 55, there are an additional pair of sprockets 57, one of which may be seen in FIG. 3, which are toward the forward portion of the base adjacent the side 16 of the conveyor 10. These sprockets 56 and 57 have a chain 58 interconnecting them so that rotation of either one of the sprockets 56 will effect rotation of the other sprocket to effectively raise or lower the support members 27 and 28, depending upon the direction and extent to which the sprockets turned.

Each of the shafts 54 and 55, at its upper end above the sprockets 56, is provided with a tool-engaging stud 59, as best shown in FIG. 3. The studs 59 may be reached by a suitable tool inserted through openings 60 or 61 which are provided in the plate 22. Mounted to the underside of plate 22 is a cavity reading system generally designated 62. Details of this system may be found in co-pending application Ser. No. 864,080 filed Dec. 23, 1977, and commonly assigned with this application.

The reading system is optical in nature and relies upon the reflections of beams of light from the undersurface of the containers and with this in view, reading system 62 is beneath platform 22 in alignment with an aperture 63 provided in the plate 22. Another aperture 64 is provided in a wear plate 65 which overlies the plate 22. Wear plate 65 extends from the edge of the conveyor belt 11 with its upper surface at the same elevation as the surface of the belt 11 so that the containers as they are moving from the inlet to the exit of the reading system will be easily slid over the upper surface of the wear plate 65 and over the apertures 63 and 64 provided therebeneath.

The cover 21 of the upper frame 17 serves as a mounting for a depending shaft 66. The shaft 66 actually is mounted for rotation within a bearing housing 67*a* with the housing being supported by the cover 21. The shaft 66, at its lower end, is provided with a pair of vertically spaced starwheels 67 and 68. The upper starwheel 67 is provided with small pockets in its periphery which are of approximately the size of the neck of the containers being handled. The lower starwheel 68 is provided with pockets that have an approximate configuration or size equal to the diameter of the containers being handled.

As the containers, which are traveling from the right, as viewed in FIG. 1, engage the starwheels 67 and 68 they will be slid from the upper surface of the conveyor 10 onto the wear plate 65. As each additional container traveling on the conveyor 10 pushes against those containers immediately in front thereof and engages pockets within the starwheels 67 and 68, the wheels will turn in unison about the vertical axis of the shaft 66. In this manner, the containers are successively moved over the aligned apertures 63 and 64 where the code on the bottom of the bottles will be read. After passing out of the view of the reading system 62, the containers will proceed following the arc of the starwheel 68 until they become engaged with a third starwheel 69 whose periphery is positioned intermediate the height of starwheels 67 and 68, but whose axis 70 is positioned to one side of the conveyor 10. Axis 70 is in the form of a vertical shaft which extends through the plate 22 and is supported from beneath the plate by a pillow block 71. Starwheel 69 is free to rotate about the axis 70 and will engage the sides of containers after they have passed the aperture 63 and 64 and serves to maintain the containers in slightly spaced-apart relationship as they are returned to the surface 11 of the conveyor 10 in the downstream end of the handling equipment. The containers are confined to the pockets of the starwheels 67 and 68 by engagement of the sides thereof with a flexible, helical spring member 72. The spring member is supported by and between a pair of generally thin roller guides 73 and 74. The member 72 is made of a generally round, spring-like, endless member, similar to what may be termed a "screendoor spring," and the guides 73 and 74 are provided with semi-circular grooves in the edges thereof within which the spring member 72 is adapted to be confined.

Figure 2:
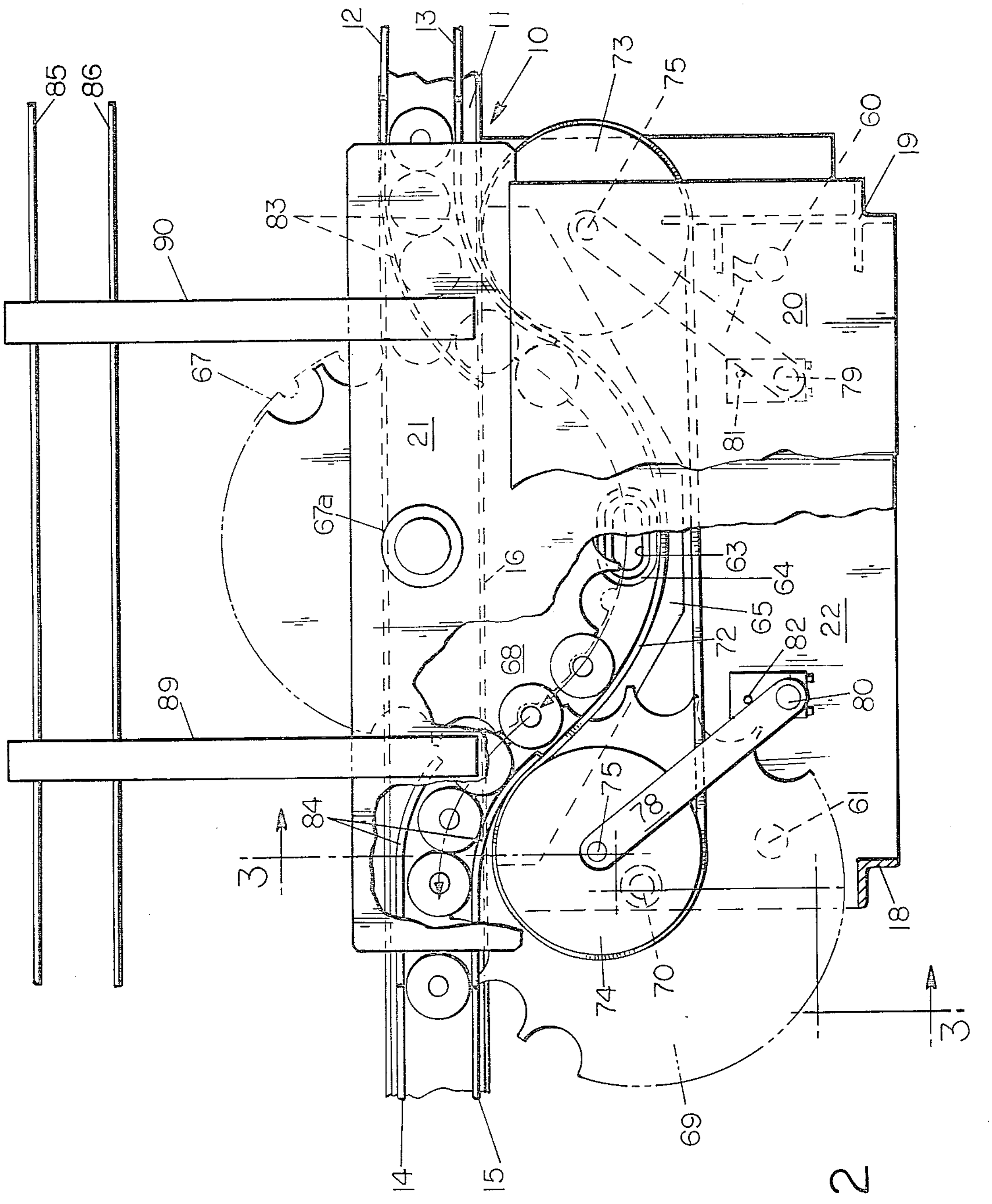
FIG. 2 is a top plan view, partly broken away, of the apparatus of FIG. 1.

Each of the guides 73 and 74 is mounted for rotation about a vertical pin 75 and 76, respectively. Each pin is carried at one end of a generally horizontal crank arm 77 and 78. The crank arms 77 and 78 have their opposite ends connected to vertical shafts 79 and 80. The shafts 79 and 80 carry clamps connected thereto with vertical pins 81 and 82 extending upwardly therefrom that engage the sides of the crank arms 77 and 78. The clamps may be adjusted so as to bias the arms 77 and 78 into counterclockwise and clockwise directions, respectively, as viewed in FIG. 2.

As an aid in guiding the containers as they enter or leave the inspection or reading system, pairs of curved rails 83 and 84 are provided. It should be pointed out that the containers are moved without external drive through the system for reading the cavity indicia with the movement being the result of line pressure of the containers arriving on the conveyor 10. For so long as the apparatus is in position to read the cavity indicia on the bottom of the containers, the equipment will operate in the manner indicated above. However, when it is necessary to take the apparatus out of position for adjustment, repair or for any other reason, it should be noted that all of the equipment which is at or above the level of the conveyor 10 is mounted on the frame 17 and may be shifted to the right, as viewed in FIG. 3 and thereby withdrawn. It should be noted that the frame 17 with its grooved rollers 25 is shiftable relative to the support members 27 and 28. When the frame 17 is shifted to the right, all of the mechanism carried by the frame will be shifted with it. In some instances, the frame can be bolted to the side of the conveyor 10 and obviously will require unfastening prior to moving the frame.

In order to permit the continuous flow of containers on the conveyor 10, even when the mechanism is retracted or moved to the right, a pair of straight guide rails 85 and 86, supported from above by vertical members 87 and 88, are shiftable into position over the conveyor 10. The members 87 and 88 are fastened to the ends of horizontal bars 89 and 90 which in turn are connected to the cover 21. Thus, as can be readily seen from viewing FIG. 3, the bars 89 and 90, in effect, serve as cantilevers for supporting the rails 85 and 86. The bars 89 and 90 are of a given length such that when the frame 17 is retracted or moved to the right, the rails 85 and 86 will be moved into alignment with the rails 12, 13, 14 and 15, in overlying relationship to the conveyor surface 11. These rails are mounted to their supporting members 87 and 88 by adjustable slots and bolts so as to accommodate glassware of short or tall configurations.

From the foregoing, it can be seen that apparatus is provided which will permit viewing the bottom of glass containers for the purpose of identifying the mold from which a particular container has been formed; and more particularly, that the viewing apparatus may be shifted from its position adjacent the conveyor carrying the ware, to a remote position while providing guidance to the uninterrupted movement of the ware on the conveyor from the entrance to the exit thereof.

We claim:

1. In apparatus for continuously moving a succession of bottles from a moving conveyor to an offline position passing over an optical inspection station, and return of the bottles to the conveyor, the improvement in the support for the inspection station comprising:

- a portable base having a pair of upstanding pillars;
- a horizontally extending member fixed to each pillar in parallel relationship;
- a frame supported on said members for horizontal movement toward and away from one side of said conveyor;
- said frame including a first platform at approximately the same height as the moving conveyor;
- means mounted on said first platform for engaging and guiding bottles off of said moving conveyor;
- a second platform mounted on said frame and positioned above said first platform;
- a vertical shaft;
- means mounting said shaft in depending relationship from said second platform;
- a starwheel mounted on the lower end of said shaft adapted to engage bottles as they are guided from the conveyor and move them in an arcuate path from the conveyor through an inspection position and back to said conveyor; and
- means mounted on said first platform for retaining the bottles in the starwheel during movement therewith.

2. The apparatus of claim 1 further including straight line guide means and means mounting said straight line guide means to said frame laterally of and at a predetermined distance from said conveyor.

3. The apparatus of claim 2 wherein said straight line guide means comprises a pair of parallel guide rails adapted to be moved with said frame upon movement thereof away from said conveyor, whereby said guide rails may be moved into overlying relationship to said conveyor.

4. The apparatus of claim 1 wherein said means on said first platform for retaining bottles in the starwheel comprises a pair of opposed pulleys rotatably mounted on vertical axes above said platform and a flexible, endless member extending about said pulleys with a portion of the span therebetween engaging the bottles in the starwheel pockets.

5. The apparatus of claim 1 further including means connected to said pillars for raising and/or lowering said frame relative to the height of the conveyor.

6. The apparatus of claim 1 wherein said frame is supported on said members by a plurality of rollers.

7. In apparatus for handling generally cylindrical articles through an inspection position, comprising:

- a driven, horizontal conveyor for supporting and moving a line of upright articles;
- an inspection device carried on a generally horizontal platform at one side of said conveyor;
- spaced, fixed guide rails overlying said conveyor for maintaining the articles in a generally straight line on said conveyor;
- said guide rails being interrupted to form a gap in the area opposite the location of said platform;
- movable guide means in said gap for guiding articles offline of said conveyor onto said platform to thereby successively move the articles past the inspection position;
- movable mounting means for said guide means and said inspection device for movement, as a unit, laterally toward and away from said conveyor; and
- straight line guide means carried by said movable mounting means and movable into alignment between the fixed guide rails to fill said gap on said conveyor when said movable mounting means is moved away from said conveyor a predetermined distance.

8. The apparatus of claim 7 wherein said movable mounting means comprises a generally rectangular frame, and a horizontal platform to which said guide means and said inspection device are fixed.

9. The apparatus of claim 8 further including a pair of horizontally extending members and means mounting said frame on said members for movement relative thereto.

10. The apparatus of claim 9 wherein said means mounting the frame on the members comprises a plurality of rollers connected to the frame and engageable with the top and bottom of said members.

* * * * *